(12) United States Patent
Alexandre

(10) Patent No.: US 6,501,744 B1
(45) Date of Patent: Dec. 31, 2002

(54) SLOTTED MODE IN WIRELESS CDMA SYSTEMS

(75) Inventor: Henon Alexandre, Newark, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/459,255

(22) Filed: Dec. 22, 1999

(51) Int. Cl.$^7$ .............................................. H04B 7/216
(52) U.S. Cl. ...................... 370/335; 370/342; 370/347; 370/332; 370/314; 370/337; 370/331; 375/225; 375/134; 375/227
(58) Field of Search ................................ 370/335, 342, 370/332, 347, 314, 331, 337; 455/436, 517, 522; 375/134, 225, 227

(56) References Cited

U.S. PATENT DOCUMENTS

| | | | |
|---|---|---|---|
| 5,533,014 A | * | 7/1996 | Willars et al. ................. 370/16 |
| 5,594,738 A | * | 1/1997 | Crisler et al. ................ 370/347 |
| 5,596,571 A | * | 1/1997 | Gould et al. ................. 370/335 |
| 5,619,491 A | * | 4/1997 | Panzer ......................... 370/342 |
| 6,320,855 B1 | * | 11/2001 | Shi ............................. 370/332 |

FOREIGN PATENT DOCUMENTS

| | | | | |
|---|---|---|---|---|
| EP | 0868093 A1 | 9/1998 | ............ | H04Q/1/00 |
| EP | 0876008 A1 | 11/1998 | ............ | H04B/7/26 |
| WO | WO9903224 | 1/1999 | ............ | H04J/13/04 |
| WO | 9956410 | 4/1999 | ............ | H04B/7/26 |

OTHER PUBLICATIONS

EIA/TIA is 2000.5.pp. 1–3.
"Compressed Mode Techniques for Inter–Frequency Measurements in a Wide–Band DS–CDMA System" M. Gustaffson et al, Waves of the Year 2000 The IEEE International Symposium on Personal Indoor and Mobile Radio Communications, vol. 1, Sep. 1, 1007. p. 231–235.

* cited by examiner

Primary Examiner—Edward F. Urban
Assistant Examiner—Marceau Milord
(74) Attorney, Agent, or Firm—Jack D. Slobod

(57) ABSTRACT

A slotted communication mode employed in a wireless code division multiple access (CDMA) communication system includes slotted frames interspersed among normal frames, each slotted frame containing a slot during which a measurement of signal quality of transmission at a different candidate operating frequency is made by the mobile station, a leading frame portion preceding the slot, and a trailing frame portion succeeding the slot. In order to mitigate an increase in bit error rate (BER) as a result of use of the slotted mode the spreading factor (SF) of data in the leading and trailing frame portions is set to a value which is greater than that of data in the normal frames. The increase of spreading factor of data in these frame portions may be accompanied by an increase in power level therein, as a further BER mitigating factor.

20 Claims, 3 Drawing Sheets

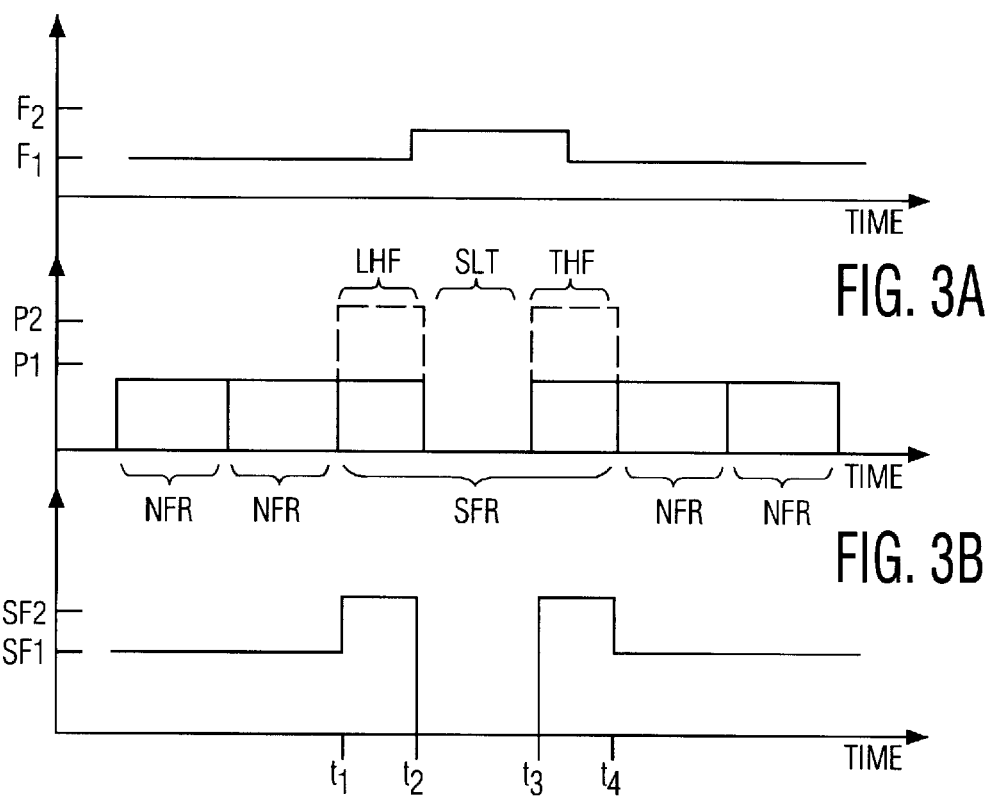

SLOTTED MODE IN WIRELESS CDMA SYSTEMS

BACKGROUND OF THE INVENTION

1. Field of the Invention

The present invention relates to the slotted mode in wireless cellular or personal communications services (PCS) Code Division Multiple Access (CDMA) systems wherein idle slots appear sandwiched between leading and trailing active frame portions or partial frames and the mobile station makes signal quality measurements during the slots, e.g. of pilot strength, at candidate operating frequencies different from the current or serving operating frequency. In its particular aspects, the present invention relates to adjustment of transmission parameters made with respect to communications in the leading and trailing frame portions to mitigate deterioration of communications and/or dropped calls.

2. Description of the Related Art

It is specified in EIA/TIA IS 2000.5 section 2.6.6.2.8.3.3 that the mobile station measures the strength of all pilots in a candidate frequency search set in one or more visits to the candidate frequency, using actions including stopping various activities at the serving frequency, tuning from the serving frequency to the candidate frequency, measuring mean input power at the candidate frequency, returning to the serving frequency, and restarting activities thereon. These inter-frequency measurements are transmitted to the network infrastructure where they are used in making handover decisions.

Handovers are employed in wireless cellular and personal communications systems to allow mobile stations to travel from the coverage area of one base station to another, including the ability to maintain the continuity of an ongoing call. While handovers are usually employed to transfer the mobile station from a current to a new base station, it is also possible to hand over a communication with the mobile station from one set of forward and reverse links to another of the same base station.

In a CDMA system a handover of a mobile station between base stations can be either a soft handover, in which during a transient period the mobile station simultaneously maintains forward and reverse links with both the current and new base stations, generally at the same frequency, and receives the same data via both base stations, and a hard handover, where the mobile station switches from current links to new links generally at a new frequency and/or of a new network without such a transient period in which current and new forward and reverse links are simultaneously maintained.

The known slotted mode is employed to provide idle slots during which the mobile station makes the inter-frequency measurements. The idle slots are usually, but not necessarily equal to a frame in duration, and are immediately preceded and immediately succeeded by frame portions or partial frames which are typically one half frame in duration. For ease of explanation, each combination of a leading frame portion, a slot, and a trailing frame portion is referred to herein as a "slotted frame", and these "slotted frames" are interspersed among the usual frames referred to herein as "normal frames". The instantaneous symbol rate $R_{INFO}$, and instantaneous spreading factor $SF=R_{CHIP}/R_{INFO}$ (where $R_{CHIP}$ is the constant chip rate of the Pseudo Noise (PN) spreading code) in these frame portions or half frames are maintained to be the same as in the normal frames. Then, in order to aid the recovery by the Viterbi decoder of symbols lost due to the lack of throughput during the slot, the power level, and consequently the symbol energy to noise ratio, of transmissions in these frame portions is increased accordingly.

However, it is not always possible to sufficiently further increase the power level of transmission, e.g. when the power level of the mobile station is already at or near its maximum radiated power, which leads to increases in bit error rate (BER). Under such circumstances, the slotted mode may cause a dropped call, causing annoyance and inconvenience to the parties to the call.

OBJECTS AND SUMMARY OF THE INVENTION

It is an object of the present invention to reduce the occurrence of dropped calls as a result of the slotted mode in CDMA wireless cellular and personal communication systems, by a method which is an alternative to, or can be used in addition to, increasing transmission power during the frame portions preceding and/or succeeding slots.

The present invention is based on the insight that to substantially obviate a high risk of a dropped call during or as a result of the slotted mode, an increase in BER may be mitigated by acts including sufficiently increasing the spreading factor of transmissions to and from the mobile station during these frame portions.

Thus, a slotted mode method in accordance with the present invention employed in a wireless CDMA communication system which slotted mode includes slotted frames interspersed among normal frames, each slotted frame comprising a slot during which a measurement of signal quality of transmission at a candidate operating frequency different from the serving frequency is made by the mobile station, a leading frame portion preceding the slot, and a trailing frame portion succeeding the slot, is characterized in that data in the leading and trailing active frame portions of the slotted frame is transmitted at a spreading factor which is greater than, and preferably at least double, that of data in the normal frames.

Such a increase of spreading factor may be as an alternative to or in addition to increasing transmitting power during the active frame portions of the slotted frame.

Other objects, features and advantages of the present invention will become apparent upon perusal of the following detailed description when taken in conjunction with the appended drawing, wherein:

BRIEF DESCRIPTION OF THE DRAWING

FIGS. 3a, 3b, and 3c are, a graph of operating frequency versus time, a graph of transmission power versus time, and a graph of spreading factor (SF) versus time in accordance with the invention, respectively, in a time interval including a slotted frame.

DESCRIPTION OF THE PREFERRED EMBODIMENTS

Figure 1:
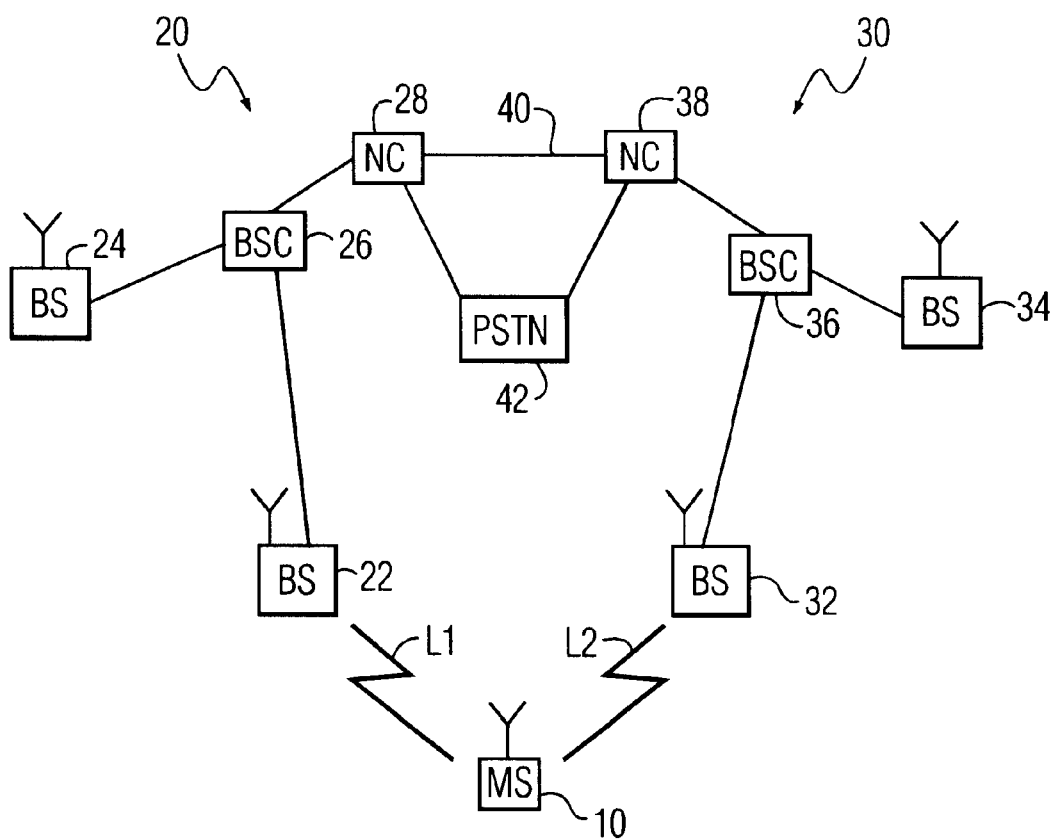
FIG. 1 schematically shows a mobile station in conjunction with a pair of wireless cellular networks.

Referring first to FIG. 1, there is shown a mobile station 10, which is capable of roaming, including while on a call, from the wireless coverage area of a first base station 22 of a Direct Sequence Code Division Multiple Access (DS- CDMA) network 20 to the wireless coverage of a second base station 32, which may be of the same network, or of a different DS-CDMA different network 30 as illustrated, such that an "inter-frequency" handover may be required. By this is meant that the call is switched or transferred from a set of forward and reverse links L1 of mobile station 10 with base station 22 of network 20, which is at an operating frequency F1, to a set of forward and reverse links L2 of mobile station 10 with base station 32 of network 30, which is at an operating frequency F2. The decision to command a handover is made in network 20 and is preceded by measurements by mobile station 10 of signal quality of neighboring base stations, the results of which the mobile station communicates to network 20. Such signal quality measurements include inter-frequency measurements, including of pilot transmissions from base station 32, which measurements are made during idle slots presented in the slotted mode.

At the level of detail shown in FIG. 1, the networks 20 and 30 are conventional. For purposes of illustration the network 20 is shown as comprising two base stations 22, 24, a base station controller 26 which controls the plurality of base stations 22, 24, and a network controller 28 which controls network 20. Similarly, network 30 is shown as comprising two base stations 32, 34, a base station controller 36 which controls the plurality of base stations 32, 34, and a network controller 38 which controls network 20. The network controllers are coupled by a communication link 40, and also each network controller is coupled to the public switched telephone network (PSTN) 42.

Figure 2:
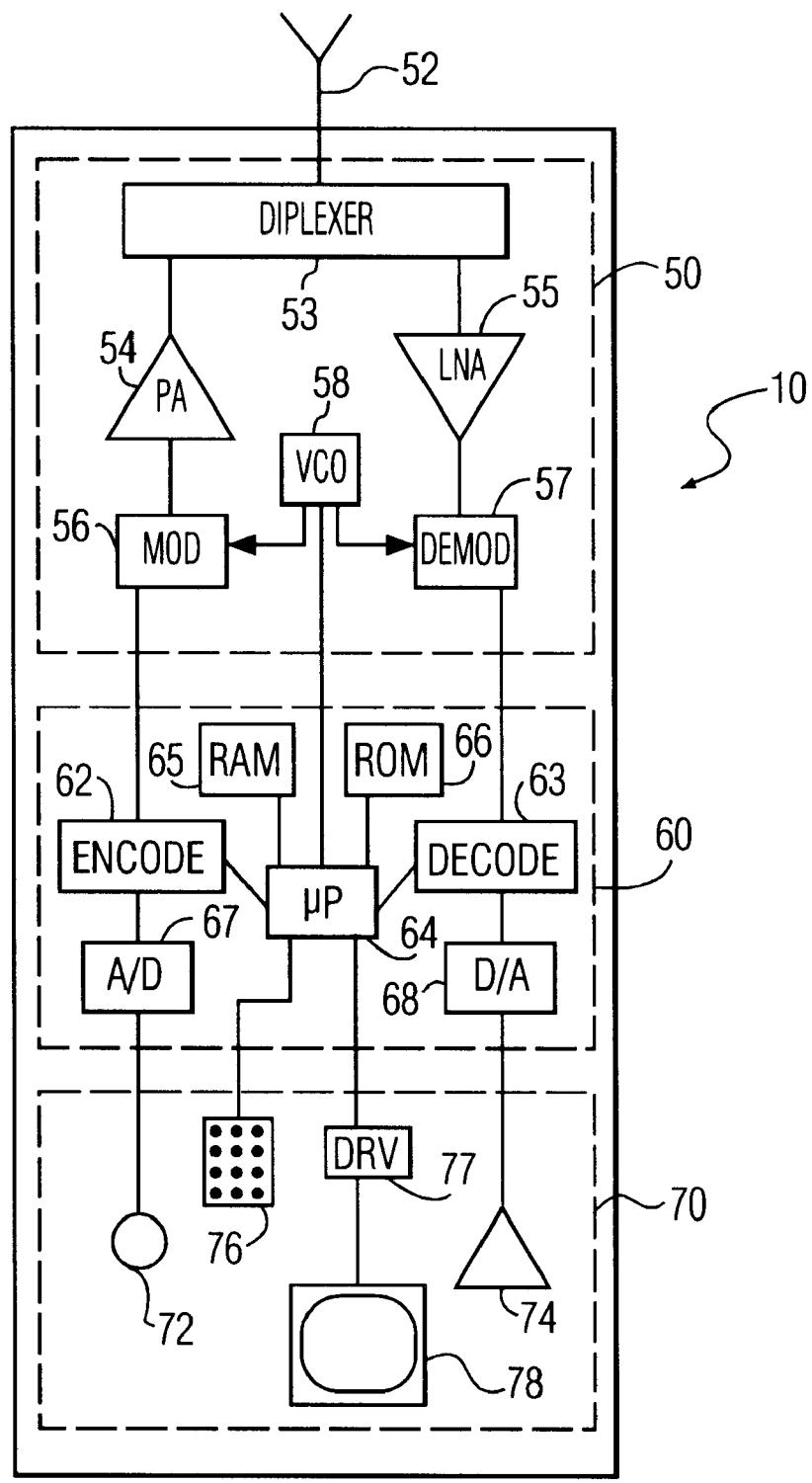
FIG. 2 is a general schematic diagram of the mobile station in FIG. 1.

Mobile station 10 is schematically shown in FIG. 2, which is also conventional at the level of detail shown. Therein, mobile station is seen to comprise an RF section 50, a baseband section 60, and a user interface section 70. RF section 50 comprises an antenna 52 coupled to a diplexer 53 which receives from the output of a power amplifier 54 an RF spread spectrum communication signal to be transmitted by antenna 52 and supplies an RF spread spectrum communication signal to the input of a low noise amplifier 55 which has been received by antenna 52. A modulator 56, preferably having a zero IF structure (not shown), receives a baseband spread spectrum communication signal from an encoder 62 of baseband section 60, and an RF carrier signal from voltage controlled oscillator or frequency synthesizer 58 and supplies an RF spread spectrum communication signal to the input of power amplifier 54. Similarly, demodulator 57, preferably also having a zero IF structure (not shown), receives an RF spread spectrum communication signal from the output of low noise amplifier 55 and an RF carrier signal from oscillator or synthesizer 58 and supplies a baseband spread spectrum communication signal to decoder 63 of baseband section 60. Generally, at least the encoder 62 and decoder 63 are implemented by a digital signal processor (not shown). In addition to encoding and decoding, encoder 62 and decoder 63 also perform spectrum spreading and despreading, respectively, in a well known manner by application of the relevant PN code sequence, at the relevant phase. Baseband section 60 also includes a microprocessor 64 which controls the frequency of oscillator or synthesizer 58, controls encoder 62 and decoder 63, and accesses a volatile random access memory unit 65 and a non-volatile read-only or memory unit 66, at least a part of which is programmable, e.g. an EEPROM (not shown) to contain firmware constituting the instructions used by microprocessor 64 to steer various events involved in the mobile station side of setup and handover of calls, including inter-frequency measurements of signal quality of pilot transmissions neighboring base stations at a different candidate operating frequencies, such as from base station 32.

Also included in baseband section 60 is an analog to digital (A/D) converter 67 which feeds encoder 62 and is fed by a microphone 72 of user interface section 70, and a digital to analog converter 68 which is fed by decoder 63 and feeds a speaker 74 of user interface section 70.

In CDMA wireless cellular systems, in particular in accordance with standards under development for third generation (3G) systems, various transmission parameters for the downlink or forward link from the current base station 22 to mobile station 10 and for the uplink or reverse link from mobile station 10 to current base station 22 can be adapted on a frame by frame basis by communication between the mobile station and the current base station. These parameters include transmission power and spreading factor. The latter is the ratio $R_{CHIP}/R_{INFO}$, where $R_{CHIP}$ is the chip rate of the Pseudo Noise (PN) spreading code, and $R_{INFO}$ is the symbol rate. Transmission power is normally adapted in a power control loop formed by interaction between the current base station and the mobile station in order to maintain signal quality. Transmission power is also adapted as the symbol rate and spreading factor are varied in a multi-rate service, since the transmit power may be reduced as the spreading factor is increased due to decrease of the symbol rate in order to improve the capacity of the CDMA system.

"As previously mentioned, in accordance with the present invention, the BER is substantially prevented from increasing during the slotted mode in a CDMA system by increasing the instantaneous spreading factor of transmissions to and from the mobile station during the active partial frame portions of the slotted frames. This increase in instantaneous spreading factor may be accompanied by, or be used instead of, an increase in the instantaneous transmission power level."

"Slotted frames are periodically interspersed among non-slotted or normal frames in a ratio such that there are plural normal frames for each slotted frame. In FIGS. 3A–3C, there is illustrated a sequence of two normal frames NFR, a slotted frame SFR, and two further normal frames NFR. Slotted frame SFT begins at time t1 and ends at time t2, an active leading frame portion or half frame LHF spanning the interval between t1 and t2, the idle slot SLT spanning the interval between t2 and t3, and the active trailing frame portion or half frame THF spanning the interval between t3 and t4. As further shown in FIG. 3A, the operating frequency of mobile station 10 outside of the time interval spanned by the idle slot SLT is the serving frequency F1, during which the mobile station is in communication with current base station 22. The operating frequency of mobile station 10 is switched to the candidate frequency F2 during the idle slot SLT, to allow it to tune to the candidate frequency F2 from base station 32 and measure the power of pilot transmissions at that frequency, which indicates the signal quality thereof."

Further, as shown in FIG. 3B, the power level is maintained at level P1 in the normal frames NFR, but shows two alternatives during the leading frame portion LHF preceding idle slot SLT and the trailing frame portion succeeding idle slot SL. In one alternative, indicated by a solid line, the power level remains at P1 during these frame portions, under which circumstances the entire BER mitigating effect must be produced by increasing spreading factor, whereas in the other alternative, indicated by dashed line the instantaneous power level is increased to level P2, such that part of the BER mitigating effect is due to this increase.

"In accordance with the present invention, instead of, or in addition to, increasing the power level during frame portions LHF and THF, the spreading factor SF is increased from SFI to SF2 in those intervals. The ratio between SF2 and SF1 is readily chosen by persons of ordinary skill in the art to prevent increase in BER, taking into account whether there is an accompanying increase in power level, and if so, the ratio of P2 to P1. Preferably, where an increase in spreading factor is utilized, SF2 is at least twice SF1. For example, SF1 and SF2 are 32 and 64, respectively.

It should now be appreciated that the objects of the present invention have been satisfied. While the present invention has been described in particular detail, it should also be appreciated that numerous modifications are possible within the intended spirit and scope of the invention. In interpreting the appended claims it should be understood that:

a) the word "comprising" does not exclude the presence of other elements or steps than those listed in a claim;

b) the word "a" or "an" preceding an element does not exclude the presence of a plurality of such elements.

c) any reference signs in the claims do not limit their scope; and d) several "means" may be represented by the same item of hardware or software implemented structure or function.

What is claimed is:

1. A slotted mode method in a wireless CDMA communication system in which while a mobile station is in communication at a serving operating frequency with a first base station, a slotted communication mode is employed which includes slotted frames interspersed among normal frames containing data at a first spreading factor and a first power level, each slotted frame comprising a slot during which a measurement of signal quality of transmission at a different candidate operating frequency is made by the mobile station, a leading frame portion preceding the slot, and a trailing frame portion succeeding the slot, both of which frame portions contain data having a second spreading factor and a second power level, characterized in that the second spreading is greater than the first spreading factor.

2. The method as claimed in claim 1, wherein the second power level is equal to the first power level.

3. The method as claimed in claim 1, wherein the second power level is greater than the first power level.

4. The method as claimed in claim 1, wherein the second spreading factor is at least double the first spreading factor.

5. The method as claimed in claim 2, wherein the second spreading factor is at least double the first spreading factor.

6. The method as claimed in claim 3, wherein the second spreading factor is at least double the first spreading factor.

7. A program stored in a memory for causing a processor within a mobile station to steer a mobile station end of a slotted mode method in a wireless CDMA communication system in which while a mobile station is in communication at a serving operating frequency with a first base station, a slotted communication mode is employed which includes slotted frames interspersed among normal frames containing data at a first spreading factor and a first power level, each slotted frame comprising a slot during which a measurement of signal quality of transmission at a different candidate operating frequency is made by the mobile station, a leading frame portion preceding the slot, and a trailing frame portion succeeding the slot, both of which frame portions contain data having a second spreading factor and a second power level, characterized in that the second spreading is greater than the first spreading factor.

8. The program as claimed in claim 7, wherein the second power level is equal to the first power level.

9. The program as claimed in claim 8, wherein the second power level is greater than the first power level.

10. The program as claimed in claim 7, wherein the second spreading factor is at least double the first spreading factor.

11. The program as claimed in claim 8, wherein the second spreading factor is at least double the first spreading factor.

12. The program as claimed in claim 9, wherein the second spreading factor is at least double the first spreading factor.

13. A mobile station containing a program stored in a memory for causing a processor within the mobile station to steer a mobile station end of a slotted mode method in a wireless CDMA communication system in which while the mobile station is in communication at a serving operating frequency with a first base station, a slotted communication mode is employed which includes slotted frames interspersed among normal frames containing data at a first spreading factor and a first power level, each slotted frame comprising a slot during which a measurement of signal quality of transmission at a different candidate operating frequency is made by the mobile station, a leading frame portion preceding the slot, and a trailing frame portion succeeding the slot, both of which frame portions contain data having a second spreading factor and a second power level, characterized in that the second spreading is greater than the first spreading factor.

14. The mobile station as claimed in claim 13, wherein the second power level is equal to the first power level.

15. The mobile station as claimed in claim 13, wherein the second power level is greater than the first power level.

16. The mobile station as claimed in claim 13, wherein the second spreading factor is at least double the first spreading factor.

17. A slotted communication mode signal which is employed in a wireless CDMA communication system while a mobile station is in communication at a serving operating frequency with a first base station, said slotted communication mode signal including slotted frames interspersed among normal frames containing data at a first spreading factor and a first power level, each slotted frame comprising a slot during which a measurement of signal quality of transmission at a different candidate operating frequency is made by the mobile station, a leading frame portion preceding the slot, and a trailing frame portion succeeding the slot, both of which frame portions contain data having a second spreading factor and a second power level, wherein the second spreading is greater than the first spreading factor.

18. The signal as claimed in claim 17, wherein the second power level is equal to the first power level.

19. The signal as claimed in claim 17, wherein the second power level is greater than the first power level.

20. The signal as claimed in claim 17, wherein the second spreading factor is at least double the first spreading factor.

* * * * *